(12) United States Patent
Takeuchi et al.

(10) Patent No.: US 11,789,606 B2
(45) Date of Patent: Oct. 17, 2023

(54) INFORMATION PROCESSING DEVICE

(71) Applicant: Faurecia Clarion Electronics Co., Ltd., Saitama (JP)

(72) Inventors: Kenji Takeuchi, Saitama (JP); Masahiko Seki, Saitama (JP); Yuichiro Nakagawa, Saitama (JP); Hiroe Ushio, Saitama (JP); Miku Nagatsuka, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 22 days.

(21) Appl. No.: 17/885,017

(22) Filed: Aug. 10, 2022

(65) Prior Publication Data

US 2023/0067058 A1    Mar. 2, 2023

(30) Foreign Application Priority Data

Aug. 24, 2021   (JP) .................................. 2021-136274

(51) Int. Cl.
*G06F 3/04886*     (2022.01)

(52) U.S. Cl.
CPC .................. *G06F 3/04886* (2013.01)

(58) Field of Classification Search
CPC ..... G06F 3/013; G06F 3/017; G06F 2203/011; G06F 3/011; G06F 3/167; G06F 2203/04101; G06F 3/04186; G06F 3/0446; G06F 3/04842; G06F 3/04845; G06F 3/04886; G06F 3/165; G06F 3/04817; G06F 3/0482; G06F 21/31; G06F 3/0481; G06F 3/04812; G06F 3/0488; G06F 1/1616; G06F 1/1647; G06F 1/1626; G06F 1/1652; G06F 2203/04102; G06F 2203/04803; G06F 3/005; G06F 3/0412; G06F 3/0487; G06F 3/04883; G06F 3/0486; G06F 9/451

See application file for complete search history.

(56) References Cited

U.S. PATENT DOCUMENTS

| 2002/0039923 A1* | 4/2002 | Cannon et al. ...... G07F 17/3244 463/42 |
| 2005/0111866 A1* | 5/2005 | Sato .................... G03G 15/502 399/79 |
| 2010/0293508 A1* | 11/2010 | Hwang et al. ....... G06F 3/04886 715/846 |
| 2012/0030596 A1* | 2/2012 | Hanes ................. G06F 3/0481 715/765 |

(Continued)

FOREIGN PATENT DOCUMENTS

JP    2013-096736 A    5/2013

*Primary Examiner* — Rayeez R Chowdhury
(74) *Attorney, Agent, or Firm* — Volpe Koenig

(57) ABSTRACT

An information processing device improves hygiene while minimizing any reduction in icon operating convenience, and comprises: an authentication result acquiring unit that acquires authentication results of a user who operates the device; a display unit displaying one or more operation icons; a touch input detecting unit detecting a touch operation on an operation icon displayed on the display unit; a touch position history recording unit detecting the touched position in the touch operation and records the touched position as a historical record in a predetermined storage unit; a screen generating unit generating a screen to be displayed on the display unit; and an icon position changing unit changing the position of the operation icon on the screen based on the history of the touched position when there is a change in the user identified in the authentication results obtained by the authentication result acquiring unit.

13 Claims, 11 Drawing Sheets

(56) References Cited

U.S. PATENT DOCUMENTS

| | | | |
|---|---|---|---|
| 2013/0111403 A1* | 5/2013 | Nakamura | B60K 35/00 715/810 |
| 2014/0242949 A1* | 8/2014 | Burch et al. | G06F 3/0416 455/411 |
| 2015/0177962 A1* | 6/2015 | Seong et al. | G06F 3/0421 715/781 |
| 2019/0138126 A1* | 5/2019 | Higuchi | G06F 3/016 |

* cited by examiner

Fig. 2

User History Information 111

| Authentication Date and Time | User |
|---|---|
| 2021/05/05 08:34:56 | A |
| 2021/05/05 12:21:43 | B |
| ... | ... |

Layout Information

| Layout Identifier | Layout Information | Adoption Order |
|---|---|---|
| Layout001 | ... | 01 |
| ... | ... | ... |

Fig. 5

User Registration Information

511

| User | User-Specific Information |
|---|---|
| A | ... |
| ... | ... |

511a 511b

INFORMATION PROCESSING DEVICE

TECHNICAL FIELD

The present invention relates to a technology for an information processing device.

BACKGROUND ART

Patent Document 1 describes a technology related to a display device for a vehicle "wherein when a user brings a finger close to a display panel, a finger position detecting means 16 detects the approach of the user's finger and the position being approached on the display panel, and a display control means in the control device 2 goes into icon approach display mode to display a plurality of operation icons in a second arrangement close to the position on the display panel 14 being approached by the finger."

PRIOR ART DOCUMENTS

Patent Documents

[Patent Document 1] JP 2013-096736 A

SUMMARY OF THE INVENTION

Problem to Be Solved by the Invention

By using this technology, operation icons can be selectively operated at a position closer to the seat. However, when a touch panel is used by an unspecified number of users, improved safety in terms of hygiene is required.

It is an object of the present invention to provide a technology that improves safety in terms of hygiene while minimizing any reduction in icon operating convenience.

Means for Solving the Problem

The present invention includes a plurality of means for solving at least some of the problem. The following is an example. In order to solve the problem, the present invention is an information processing device comprising: an authentication result acquiring unit that acquires authentication results of a user who operates the information processing device; a display unit that displays one or more operation icons operated by the user; a touch input detecting unit that detects a touch operation on an operation icon displayed on the display unit; a touch position history recording unit that detects the touched position in the touch operation and records the touched position as a historical record in a predetermined storage unit; a screen generating unit that generates a screen to be displayed on the display unit; and an icon position changing unit that changes the position of the operation icon on the screen based on the history of the touched position when there is a change in the user identified in the authentication results obtained by the authentication result acquiring unit.

Effect of the Invention

The present invention is able to provide a technology that improves safety in terms of hygiene while minimizing any reduction in icon operating convenience. Problems, configurations, and effects other than those mentioned above will be clarified in the description of embodiments.

BRIEF DESCRIPTION OF THE DRAWINGS

FIG. 2 is a diagram showing an example of a data structure for the user history information.

FIG. 4 is a diagram showing an example of a data structure for layout information.

FIG. 5 is a diagram showing an example of a data structure for user registration information.

EMBODIMENTS OF THE INVENTION

Figure 1:
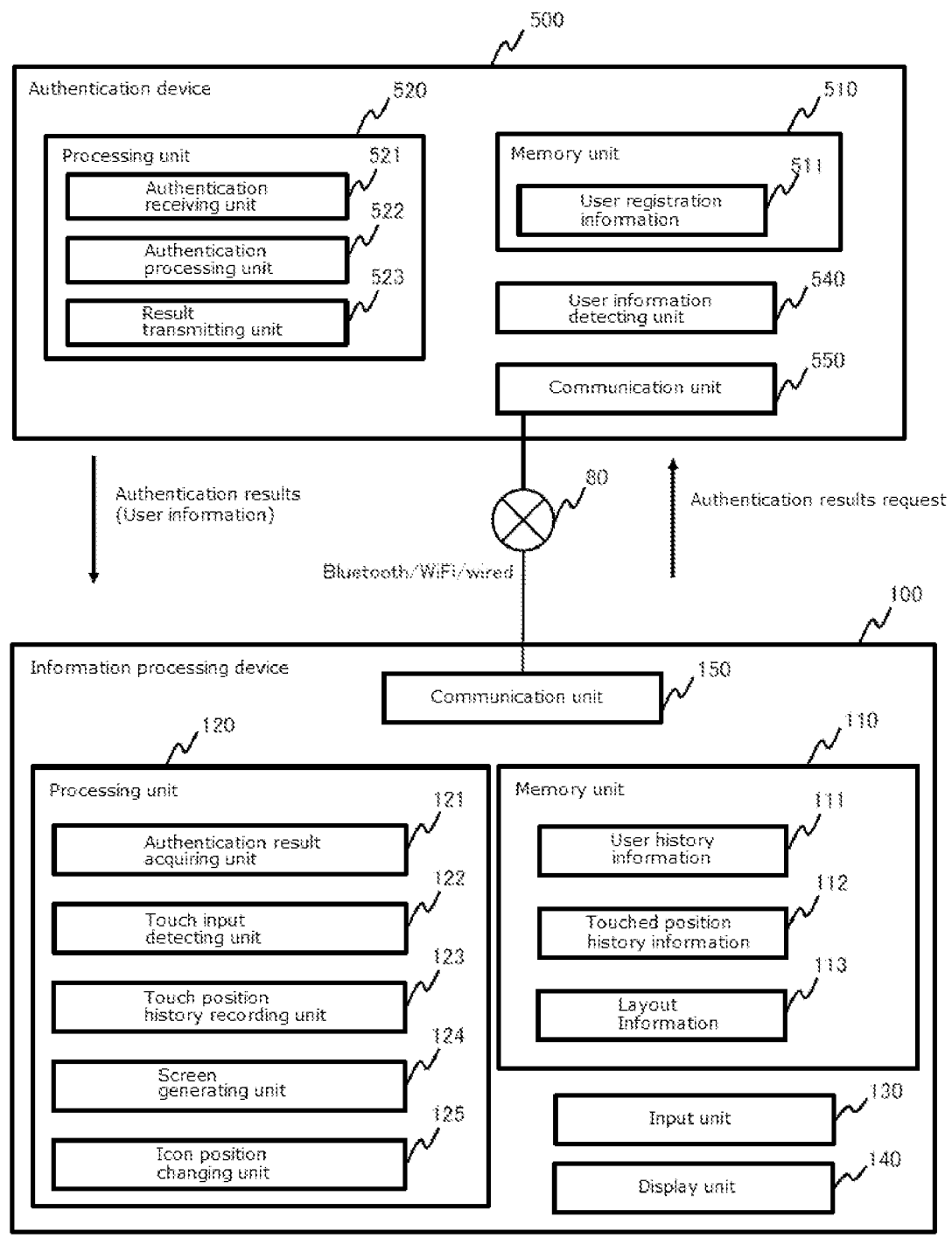
FIG. 1 is a diagram showing an example of a configuration for the information processing device.

The information processing devices in embodiments of the present invention will now be described with reference to the drawings. FIGS. 1 to 11 do not show all of the configurations of the information processing device, and some portions of the configurations have been omitted when appropriate to make the description easier to understand. The following description will be divided into a plurality of sections or embodiments when necessary to make the description easier to understand. Unless otherwise specified, they are not unrelated to each other, but one may be related to some or all of the others in terms of modifications, details, and supplementary explanations, etc.

In the following description, when numbers of elements are mentioned (including number, numerical values, quantities, ranges, etc.), they are not limited to a specific number unless explicitly stated or if clearly limited to a specific number in principle, and the total may be more than or less than a specific number.

In the following description, components (including steps, etc.) are not necessarily essential unless otherwise specified or clearly considered essential in principle.

In the following description, the shape and positional relationship, etc. of components mentioned include those that are substantially approximate or similar in terms of shape and positional relationship, etc., except when explicitly stated or when it is considered clearly not the case in principle. The same is true for numerical values and ranges.

In the drawings used to explain the embodiments, identical components are designated in principle by the same numbers and redundant descriptions of these components may be omitted. In the embodiments, expressions such as "consists of A," "is composed of A," "has A," and "includes A" do not exclude other elements, except when it is clearly stated that these are the only elements.

In the following description, the shape and positional relationship, etc. of components mentioned include those that are substantially approximate or similar in terms of shape and positional relationship, etc., except when explicitly stated or when it is considered clearly not the case in principle.

In the following description, the "communication unit" may be one or more interface devices. The one or more interface devices may be one or more type of communication interface device (for example, one or more NICs or Network Interface Cards) or two or more different types of communication interface device (for example, a NIC and an HBA (Host Bus Adapter)).

In the following description, the "memory" is one or more memory devices that are examples of storage devices, but is typically a main storage device. At least one memory device in the memory may be a volatile memory device or a non-volatile memory device.

In the following description, the "storage device" may be one or more permanent storage devices that are examples of storage devices. Permanent storage devices are typically non-volatile storage devices (for example, auxiliary storage devices), but may be an HDD (Hard Disk Drive), an SSD (Solid State Drive), an NVME (Non-Volatile Memory Express) drive, or an SCM (Storage Class Memory).

In the following description, the "storage unit" may be a memory, a storage device, or both.

In the following description, the "processing unit" or "processor" may be one or more processor devices. The at least one processor device is typically a microprocessor device such as a CPU (Central Processing Unit), but may be another type of processor device such as a GPU (Graphics Processing Unit). The at least one processor device may be a single-core or a multi-core processor device. The at least one processor device may be a processor core. The at least one processor device may a processor device in the broad sense of the term, such as a circuit that is a collection of gate arrays using a hardware description language to perform some or all of the processing (for example, an FPGA (Field-Programmable Gate Array), a CPLD (Complex Programmable Logic Device), or an ASIC (Application Specific Integrated Circuit)).

In the following explanation, a function may be explained using the expression a "yyy unit." However, a function may be realized by executing one or more computer programs using the processor, may be realized using one or more hardware circuits (such as an FPGA or ASIC), or may be realized using a combination thereof. When a function is realized by a program executed by a processor, the specified processing is performed if appropriate using a storage device and/or an interface device, and the function may be at least a portion of the processor. A process described with a function serving as the subject may be a process performed by a processor or a device including a processor. A program may be installed from a program source. A program source may be, for example, a program distributing computer or a computer-readable recording medium (such as a non-temporary recording medium). The descriptions of each function are mere examples, and a plurality of functions may be combined into a single function, or a single function may be divided into a plurality of functions.

In the following description, when a process is explained using a "program" or "processing unit" as the subject, the process described with a program or a processing unit as the subject may be a process performed by a processor or a device including a processor. Also, two or more programs may be realized as a single program, or a single program may be realized as two or more programs.

In the following description, information outputted based on input may be described using an expression such as an "xxx table." The information may be a table with any structure or a learning model represented by a neural network, a generic algorithm, or a random forest that generates outputs based on input. Therefore, an "xxx table" can be referred to as "xxx information" or "xxx data." In the following description, the configuration of each table is a mere example. A single table may be divided into two or more tables, or some or all of two or more tables may be combined in a single table.

In the following description, the "information processing device" and the "authentication device" may be composed of one or more physical computers (for example, an in-vehicle device such as a car navigation device, a vehicle control device, a server device, or a data center), or may be a system (such as a cloud computing system) realized in a group of physical computing resources (such as a cloud platform). An information processing device "outputting" information may be used to display information, for example, on the display screen of a display device (a display, etc.) that is connected so as to be able to communicate with the information processing device.

In the present embodiment, an information processing device 100 is connected to an authentication device 500 and installed in an automobile. However, the information processing device 100 does not have to be installed in an automobile, and can be installed in other vehicles such as trains, boats, and ferries. The information processing device 100 can also be installed in an environment shared by users, such as a call center or a training facility.

FIG. 1 is a diagram showing an example of a configuration for the information processing device. The information processing device 100 is an on-board device. However, the information processing device 100 may alternatively be a smartphone, a mobile phone, or a tablet terminal. An authentication device 500 is connected to the information processing device 100 via a wired or wireless communication route 80. As described later in greater detail, in a wired connection, the information processing device 100 and the authentication device 500 are connected by a cable in compliance with a standard such as USB (Universal Serial Bus). In a wireless connection, the information processing device 100 and the authentication device 500 are connected via an antenna and a communication protocol in compliance with communication standards such as Bluetooth (registered trademark) or Wi-Fi (registered trademark).

However, the present invention is not limited to this aspect. For example, the information processing device 100 may be connected to many other communication devices, or the communication device may be a device that serves as an access point to, for example, a wireless LAN (Local Area Network). The information processing device 100 may also be integrated with the communication device. The processing unit 120 in the information processing device 100 may also be realized as a cloud service to which the smartphone is connected when used.

The communication route 80 can be an in-vehicle network such as in-vehicle Ethernet, CANFD (CAN with Flexible Data-Rate) or CXPI (Clock Extension Peripheral Interface), a wired connection using a USB, or another network such as Bluetooth, Wi-Fi, the Internet, or an intranet. The communication route 80 is not limited to these examples, and may be a WAN (Wide Area Network), a mobile phone network, or a communication network in which these are combined. The communication path 80 may be a VPN (Virtual Private Network) over a wireless communication network such as a mobile phone communication network, or may be over the same network.

The information processing device 100 includes a memory unit 110, a processing unit 120, an input unit 130, a display unit 140, and a communication unit 150. The memory unit 110 includes user history information 111, touched position history information 112, and layout information 113. The processing unit 120 includes an authentication result acquiring unit 121, a touch input detecting unit 122, a touched position history recording unit 123, a screen generating unit 124, and an icon position changing unit 125.

FIG. 2 is a diagram showing an example of a data structure for user history information. In the user history information 111, an authentication date and time 111a and a user 111b are associated with each other and stored. The most recent date and time at which a user was identified by authentication is stored in the authentication date and time 111a, and information identifying the user such as a user ID is stored in the user 111b section.

Figure 3:
FIG. 3 is a diagram showing an example of a data structure for touched position history information.

FIG. 3 is a diagram showing an example of a data structure for touched position history information. In the touched position history information 112, the detected date and time 112a, the detected position 112b, and the user 112c are associated with each other and stored. The detected date and time 112a stores the date and time at which a touch was detected in a touch operation of an operation icon on the display unit 140. The detected position 112b stores the position on the screen at which the touch is detected in the touch operation of the operation icon on the display unit 140. The user 112c stores information that identifies the user who touched the operation icon on the display unit 140 in the touch operation.

FIG. 4 is a diagram showing an example of a data structure for layout information. In the layout information 113, a layout identifier 113a, layout information 113b, and an adoption order 113c are associated with each other and stored. The layout identifier 113a stores information for identifying a layout, including arrangement information for components displayed on the screen of the display unit 140. The layout information 113b stores specific layout setting information including the arrangement coordinates of the components displayed on the screen of the display unit 140. The adoption order 113c stores the adoption order of layouts specified by layout identifiers 113a, that is, the order assigned for each change of user.

The authentication result acquiring unit 121 requests the authentication results from the authentication device 500, and acquires authentication results including user information. Specifically, the authentication result acquiring unit 121 sends a request to the authentication device 500 via the communication route 80 when the information processing device 100 is activated, and acquires authentication results including the user information obtained as a result of the authentication process performed by the authentication device 500.

The touch input detecting unit 122 detects an input operation such as a tap, long tap, double tap, or flick related to operation items displayed on the display unit 140. Specifically, the touch input detecting unit 122 identifies the operator such as an operation icon or a button at the touched position, and constantly monitors the situation for touch operations. For example, when the "destination setting" icon is being displayed at the tapped position, the touch input detecting unit 122 detects tap input for the "destination setting" icon. More specifically, in the present embodiment, the touch input detecting unit 122 detects whether or not an operation icon has been touched, and if touched, identifies the touched position on the screen and the touched operation icon.

The touched position history recording unit 123 detects the touched position in a touch operation detected by the touch input detecting unit 122, and records the touched position as a historical record in the touched position history information 112 in the memory unit 110.

The screen generating unit 124 generates a screen to be displayed on the display unit 140. The screen includes one or more operation icons. The screen generating unit 124 may display the screen in any limited region on the display unit 140.

When there has been a change in the user identified in the user information included in the authentication results obtained by the authentication result acquiring unit 121, the icon position changing unit 125 changes the position of the operation icons on the screen based on the history of touched positions. For example, the icon position changing unit 125 retrieves the layout that is next in order from the layout information 113 and applies the layout on the screen, or the icon position changing unit 125 changes the display positions of certain operation icons to positions closer to the driver's seat. At this time, the icon position changing unit 125 references the touched position history recorded in the touched position history information 112 of the memory unit 110, and changes the display positions of the operation icons so as to avoid positions in the touched position history. Because the history of touch positions eventually becomes enormous over long-term use, the icon position changing unit 125 may change the display positions of the operation icons while ignoring the history after a period of time that is considered safe to a certain extent from the standpoint of hygiene. Specifically, the icon position changing unit 125 may exclude touch operations in the history whose touch time is within a predetermined length of time from the current time when changing the positions of the operation icons on the screen.

Alternatively, the icon position changing unit 125 may change the display positions of the operation icons on the screen while avoiding regions in which they have already been displayed. The icon position changing unit 125 may also change the positions of the operation icons on the screen based on the history of the touched positions when displaying a transition screen, that is, a screen (sub-screen or next screen) that appears before a certain screen. Alternatively, the icon position changing unit 125 may prioritize a change in the positions of the operation icons on the screen that are frequently touched by the user to an untouched region of the screen in the touched position history. Alternatively, the icon position changing unit 125 may randomly change the display positions of operation icons. For example, the direction of movement, amount of movement, or both may be randomly changed for operation icons, or the display positions of operation icons may be randomly switched.

The display unit 140 receives graphics information (including screen information) from the screen generating unit 124 and renders the information on the screen. For example, the display unit 140 displays a pop-up such as a message by superimposing a layer on the graphics information, or divides the display region and displays graphic information in each region. In the present embodiment, the display unit 140 may use existing technologies. Also, the input unit 130 detects the portion touched by the operator as coordinate information on the screen and sends the coordinate information to the touch input detecting unit 122. In the present invention, the input unit 130 and the display unit 140 may also use existing technologies.

The communication unit 150 establishes a communication link with another device, especially the authentication device 500, via a communication route 80. The type of communication may be wired or wireless. In the present invention, the communication route 80 may use existing technologies.

The authentication device 500 is a so-called on-board unit. Alternatively, the authentication device 500 may be a smartphone, a mobile phone, or a tablet terminal. The information processing device 100 is connected to the authentication device 500 via a wired or wireless communication route 80. However, the authentication device 500 does not have to be an independent device, and may be the same device as the information processing device 100 or a peripheral device that operates in response to instructions from the information processing device 100.

However, the present invention is not limited to the present embodiment, and the authentication device 500 may be connected to many other communication devices, and the communication device may be a device that serves as an access point to a network such as a wireless LAN. Alternatively, the authentication device 500 may be integrated with the communication device. Alternatively, the processing unit 520 in the authentication device 500 may be realized as a cloud service to which a smartphone connects when used.

The authentication device 500 includes a memory unit 510, a processing unit 520, a user information detecting unit 540, and a communication unit 550. The memory unit 510 includes user registration information 511. The processing unit 520 includes an authentication receiving unit 521, an authentication processing unit 522, and a result transmitting unit 523.

Figure 5:
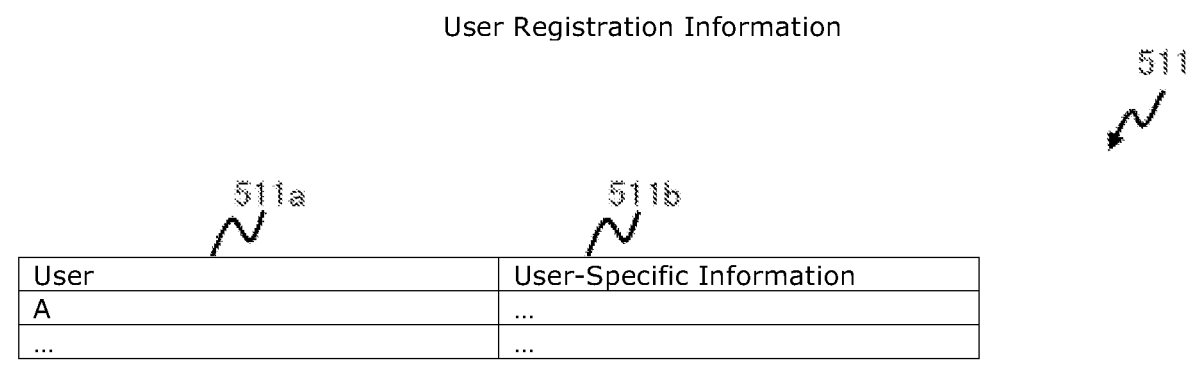

FIG. 5 is a diagram showing an example of a data structure for user registration information. In user registration information 511, the user 511a section and user-specific information 511b are associated with each other and stored. Information that identifies a user, such as a user ID, is stored in the user 511a section. User-specific information 511b stores user confirmation information used for authentication. The user confirmation information includes user-specific information preset for use by the authentication device 500 during authentication, for example, a password or biometric information such as fingerprint information or vein information.

The authentication receiving unit 521 receives requests for user authentication. For example, when the authentication receiving unit 521 receives an authentication request from the information processing device 100, the authentication processing unit 522 starts the user change determination process described later.

The authentication processing unit 522 controls the execution of the user change determination process described later.

The result transmitting unit 523 transmits authentication results including the user identifier and a different person flag from the user change determination process to the device of the user authentication requesting party (the information processing device 100 in the present embodiment).

The user information detection unit 540 receives the input of unique information on the user from the user change determination process. The communication unit 550 establishes a communication link to another device, especially an information processing device 100, via a communication route 80. The type of communication may be wired or wireless. In the present embodiment, the communication route 80 may use existing technology.

Figure 6:
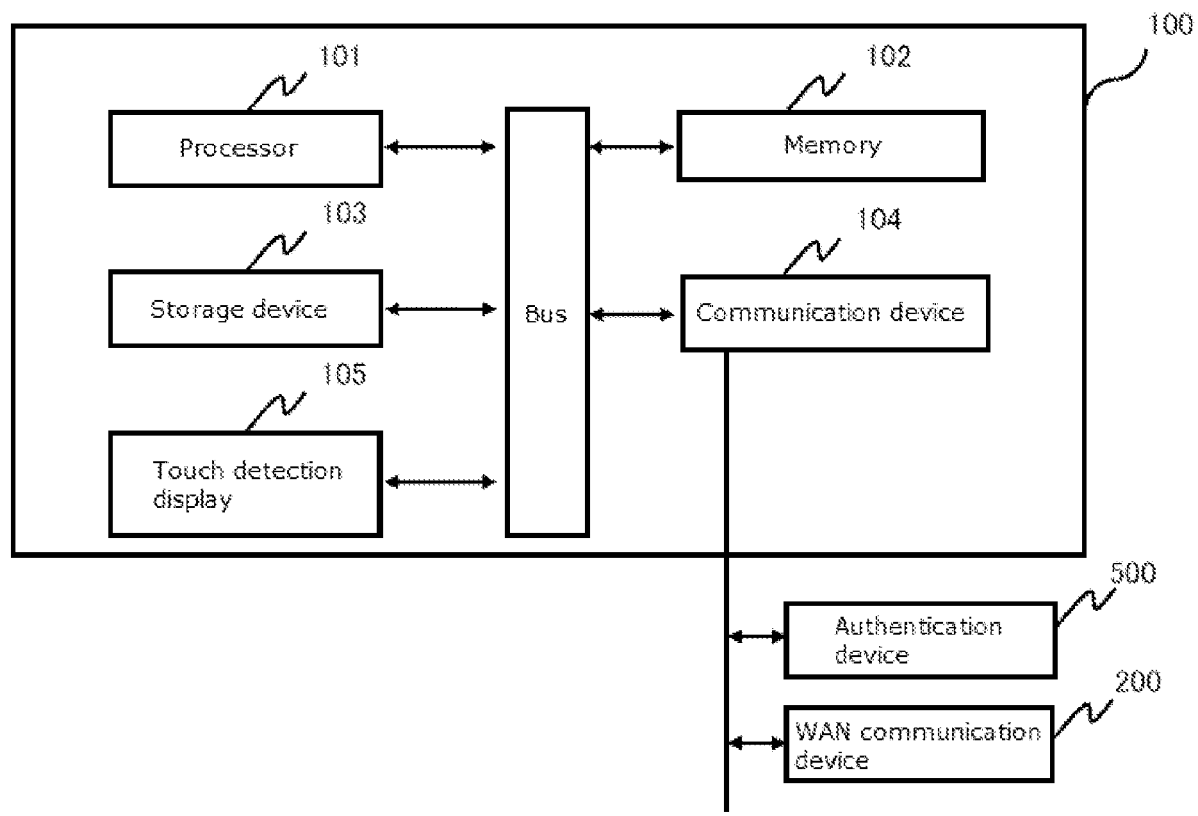
FIG. 6 is a diagram showing an example of a hardware configuration for the information processing device.

FIG. 6 is a diagram showing an example of a hardware configuration for the information processing device. The information processing device 100 can be realized using a general-purpose information processing device including a processor 101, a memory 102, a storage device 103, a communication device 104, a touch detecting display 105, and a bus connecting these components to each other. The communication device 104 serves as an interface for connecting devices other than the information processing device 100 to the information processing device 100. The authentication device 500 and the wide area communication device 200 are connected to the communication device 104.

The processor 101 can be a CPU (Central Processing Unit) or a GPU (Graphics Processing Unit). The memory 102 can be RAM (Random Access Memory). The storage device 103 can be a hard disk drive (HDD) or an SSD (Solid State Drive). The communication device 104 is the device responsible for connecting to external devices such as the authentication device 500 and the wide area network communication device 200. The touch detecting display 105 receives graphics information from the screen generating unit 124 and renders the graphics information on the screen. The touch detecting display 105 detects the portion touched by the operator as coordinate information for the screen and sends the coordinate information to the touch input detecting unit 122. In the present embodiment, the touch detecting display 105 may use existing technologies.

The wide area communication device 200 is a so-called mobile router or a mobile phone (smartphone), and establishes a route for a voice call to another party's communication device via a network and manages the connection. The communication device 104 manages the connection between the wide area communication device 200 and the information processing device 100.

Each functional unit of the processing unit 120 described above, that is, the authentication result acquiring unit 121, the touch input detecting unit 122, the touch position history recording unit 123, the screen generating unit 124, and the icon position changing unit 125, is generated by the processor 101 by retrieving and executing a predetermined program. Here, the memory 102 or the storage device 103 stores the program for realizing the processing for each functional unit. The program is loaded into the memory 102 when executed and causes the processor 101 to perform processing.

The user history information 111, the touch position history information 112, and the layout information 113 are realized by the memory 102 or the storage device 103. The input unit and the display unit 140 are realized by the touch detecting display 105, and the communication unit 150 is realized by the communication device 104.

Figure 7:
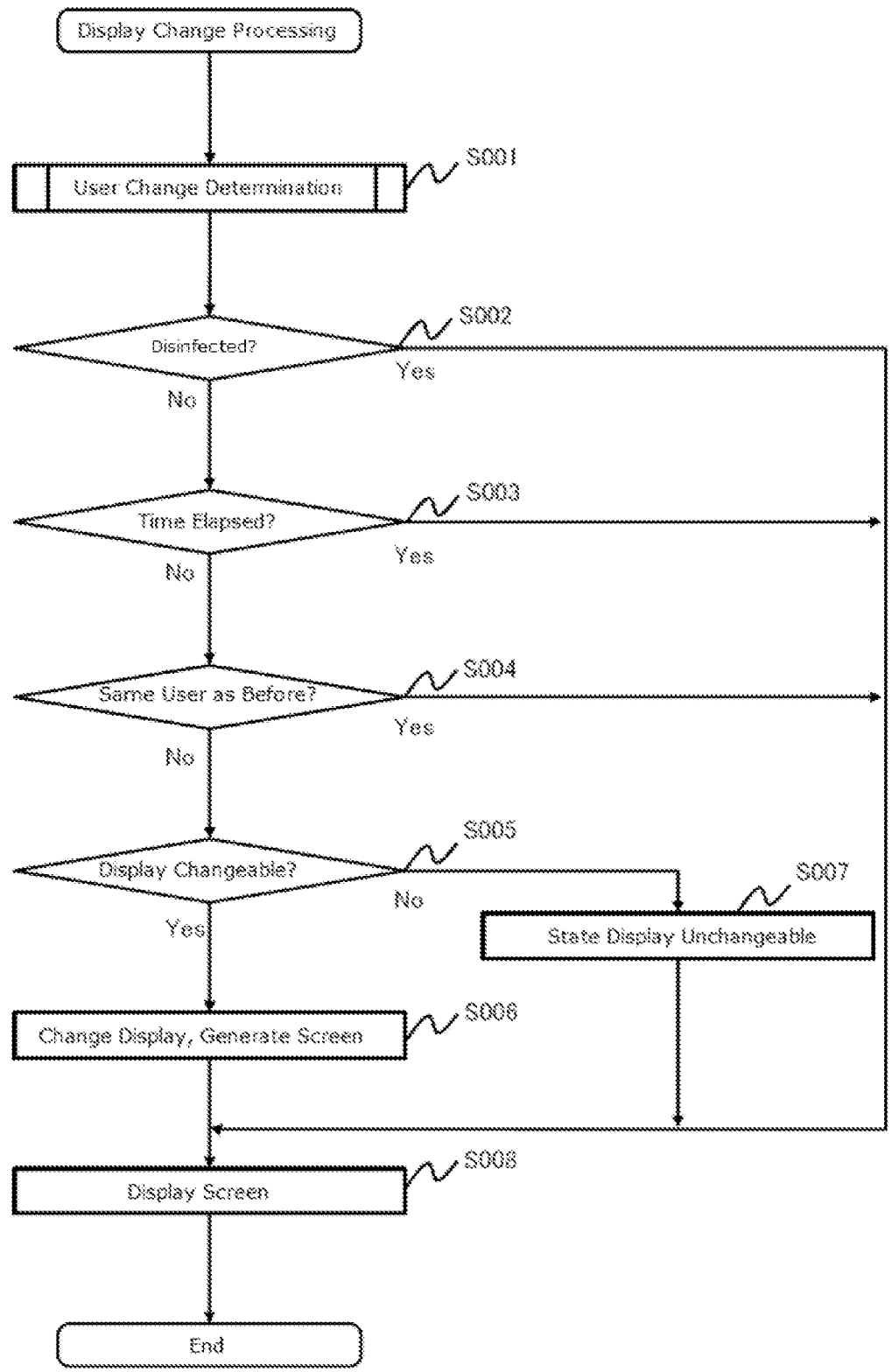
FIG. 7 is a diagram showing an example of the processing flow for display change processing.

FIG. 7 is a diagram showing an example of the processing flow for display change processing. The display change processing is started up when the information processing device 100 is activated.

First, the authentication result acquiring unit 121 performs the user change determination process described later (step S001).

The icon position changing unit 125 then determines whether the touch detecting display 105 has been disinfected (step S002). Specifically, the icon position changing unit 125 determines whether or not the touch detecting display 105 has been disinfected based on whether or not a disinfect button (not shown) was pressed when the touch detecting display 105 has been disinfected. When it has been disinfected ("Yes" in step S002), the icon position changing unit 125 advances to step S008.

When it has not been disinfected ("No" in step S002), the icon position changing unit 125 determines whether or not a predetermined time has elapsed since the information processing device 100 was last used (step S003). Specifically, the icon position changing unit 125 identifies the time at which the information processing device 100 was last used, and determines whether or not the elapsed time to the current time is equal to or longer than a predetermined time (for example, four hours or more). When the time has elapsed ("Yes" in step S003), the icon position changing unit 125 advances to step S008.

When the time has not elapsed ("No" in step S003), the icon position changing unit 125 determines whether or not the current user is the same as the previous (authenticated) user (step S004). Specifically, the icon position changing unit 125 obtains user information from the authentication results obtained from the authentication device 500. The icon position changing unit 125 then determines that the user information is the same as that of the previous user when the user information does not include a different person flag, and determines that the user information is not the same as that of the previous user when a different person flag is included. When the user is the same as the previous user ("Yes" in step S004), the icon position changing unit 125 advances to step S008.

When the user is not the same as the previous user ("No" in step S004), the icon position changing unit 125 determines whether the display can be changed (step S005). Specifically, the icon position changing unit 125 determines that the display cannot be changed when the layout that is next in order cannot be retrieved from the layout information 113, that is, when the layouts have been used up. Alternatively, the icon position changing unit 125 determines that the display cannot be changed when there is no room to change the display positions of the operation icons to positions closer to the driver's seat. Alternatively, the icon position changing unit 125 determines that the display cannot be changed when there is no room to change the display positions on the screen itself while also avoiding regions in which they have already been displayed.

When the display can be changed ("Yes" in step S005), the icon position changing unit 125 changes the display and generates a screen (step S006). Specifically, the icon position changing unit 125 retrieves the layout that is next in order from the layout information 113 and sends the layout to the screen generating unit 124. The screen generating unit 124 then applies the layout to generate a screen. Alternatively, the icon position changing unit 125 generates information for changing the display positions of the operation icons to positions closer to the driver's seat and sends the information to the screen generating unit 124. The screen generating unit 124 then applies the information to generate a screen. Alternatively, the icon position changing unit 125 generates information for changing the display positions on the screen while avoiding regions in which they have already been displayed, and sends the information to the screen generating unit 124. The screen generating unit 124 then applies the information to generate a screen.

When the display cannot be changed ("No" in step S005), the screen generating unit 124 notifies the user that the display cannot be changed (step S007). Specifically, the screen generating unit 124 can notify the user, for example, by displaying a message such as "The icons cannot be moved to avoid positions touched by a previous user. Please wipe down the screen before use." in a pop-up or generating an audio message.

When there is a screen that has been generated by the screen generating unit 124 in step S006, the screen is displayed. When a screen has not been generated in step S006, a screen is generated and displayed in the initial display position (the display positions for the operation icons set as the initial positions) (step S008).

This ends the flow in the display changing process. In the display changing process, when the user has changed and predetermined conditions have been satisfied, the positions of the operation icons can be displayed differently so that the positions where the user makes contact can be dispersed across the screen. In other words, the risk of retouching a position where a previous user has touched the screen can be avoided, the risk of infection from infectious diseases that spread by contact such as influenza, COVID-19, and SARS can be reduced, and safety can be improved in terms of hygiene.

Figure 8:
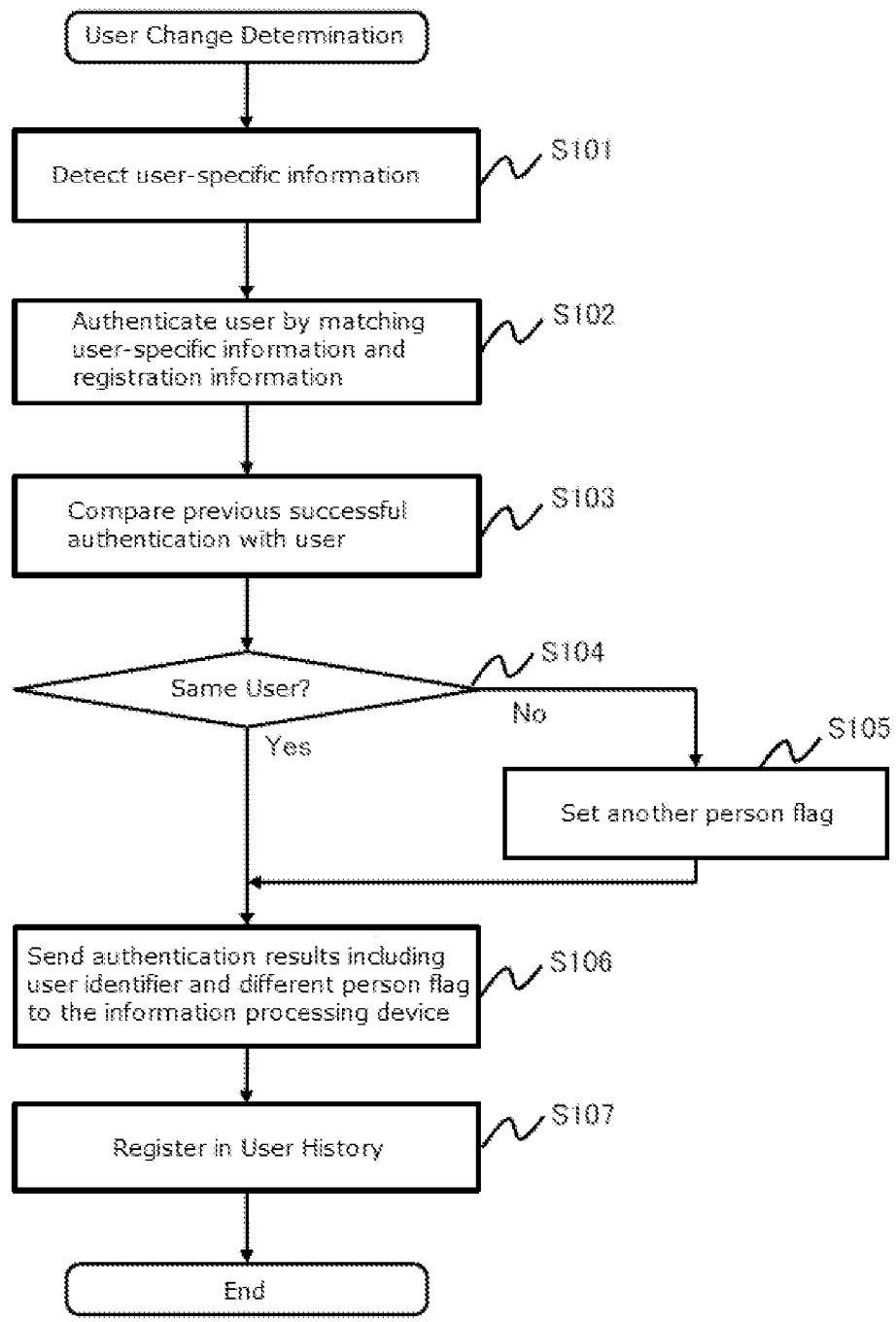
FIG. 8 is a diagram showing an example of the processing flow for the user change determination process.

FIG. 8 is a diagram showing an example of the processing flow for the user change determination process. The user change determination process is started in step S001 of the display changing process.

First, the authentication processing unit 522 detects the user-specific information (step S101). Specifically, the authentication processing unit 522 receives the input of the predetermined user-specific information required for authentication from the user information detecting unit 540. User-specific information includes, for example, a password, biometric information such as fingerprint information or vein information, or some combination of these.

The authentication processing unit 522 then matches the user-specific information with the registered information to authenticate the user (step S102). Specifically, the authentication processing unit 522 matches the user-specific information detected in step S101 with the user-specific information 511b in the user registration information 511, and identifies and authenticates the user if there is a match or predetermined relevance.

The authentication processing unit 522 then compares the previously successfully authenticated person with the current user (step S103). Specifically, the authentication processing unit 522 compares the current user to the previous person successfully authenticated by the information processing device 100.

The authentication processing unit 522 then determines whether or not the users are the same based on the results of the comparison of the previously successfully authenticated person and the current user (step S104). If the users are not the same ("No" in step S104), the authentication processing unit 522 sets a different person flag (step S105). If the users are the same ("Yes" in step S104), the authentication processing unit 522 advances to step S106 described later.

The result transmitting unit 523 then transmits the authentication results including the user identifier and the different person flag to the information processing device 100 (step S106). Specifically, the result transmitting unit 523 transmits the user identifier to the information processing device 100 as the authentication results. If a different person flag has been set in step S105, the result transmitting unit 523 includes a different person flag in the authentication results.

Then, the authentication result acquiring unit 121 in the information processing device 100 registers the authenticated user in the user history (step S107). Specifically, the authentication result acquiring unit 121 stores the user identifier in the user 111b section of the user history information 111, and associates and stores the authentication date and time 111a or the date and time at which the authentication results were received with the user identifier.

This ends the flow in the user change determination process. In the user change determination process, the user can be authenticated, and authentication results can be provided to the information processing device 100 including a different person flag indicating whether or not the previous successfully authenticated person related to the information processing device 100 and the current successfully authenticated person are different people (different users).

Figure 9:
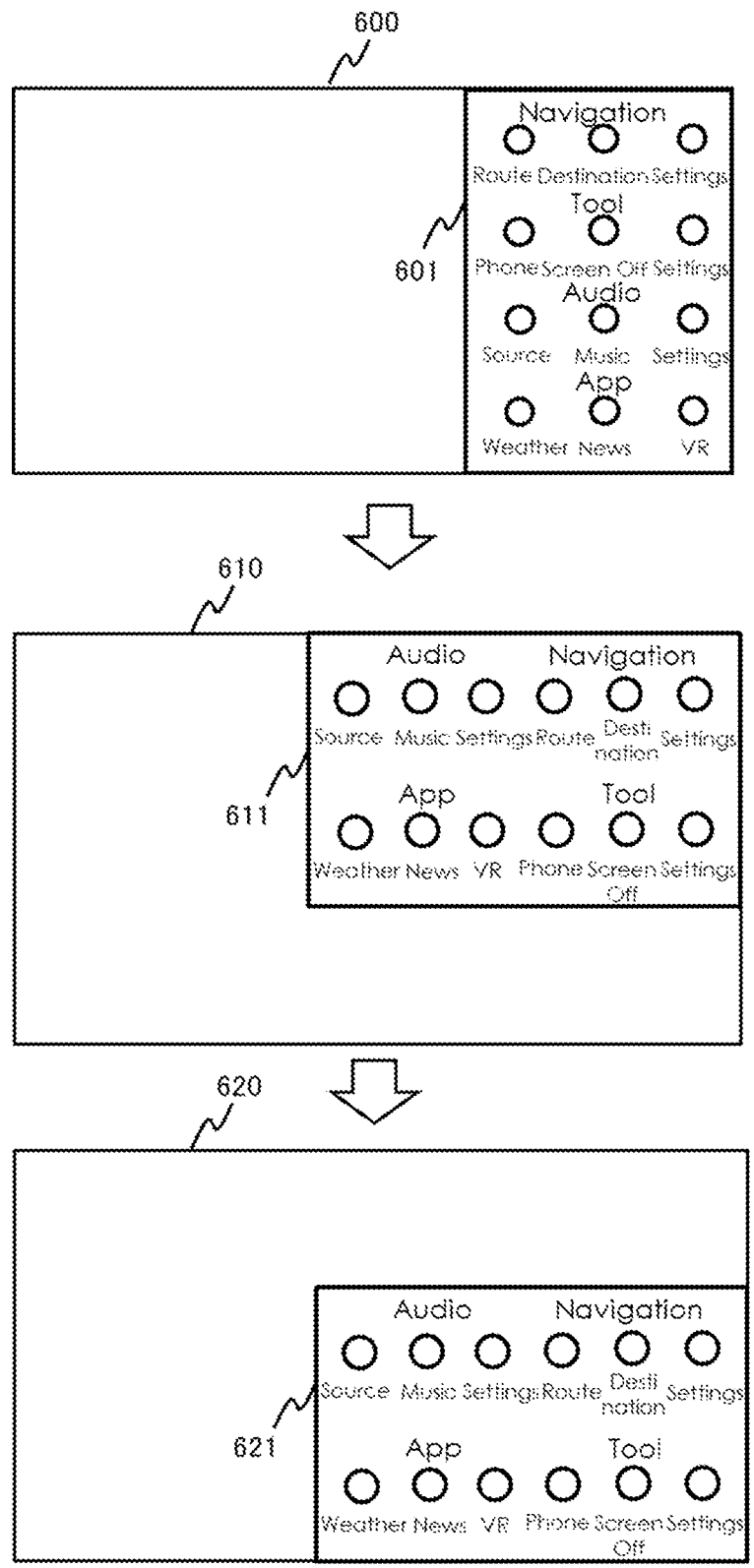
FIG. 9 is a diagram showing an example of changing layout screens.

FIG. 9 is a diagram showing an example of changing layout screens. On a screen 600 to which the first layout is applied, the operation icon display region 601 is displayed on the driver's side of the screen. (In FIG. 9, it is displayed on the right because the steering wheel is on the right. This is displayed on the left when the steering wheel is on the left.) In the operation icon display region 601, the operation icons displayed in order from the top are "Route," "Destination" and "Settings" in the "Navigation" category, "Phone," "Screen Off" and "Settings" in the "Tool" category, "Source," "Music" and "Settings" in the "Audio" category, and "Weather," "News" and "VR" in the "App" category.

The screen 610 to which the second layout has been applied is the screen shown after changing from the user to which the screen 600 with the first layout was shown to another user. On the screen 610 to which the second layout has been applied, the operation icon display region 611 is displayed closer to the driver's seat on the screen and closer to the upper end of the screen. In the operation icon display region 611, "Source," "Music" and "Settings" in the "Audio" category are displayed on the upper left, "Route," "Destination" and "Settings" in the "Navigation" category are displayed on the upper right, "Weather," "News" and "VR" in the "App" category are displayed on the lower left, and "Phone," "Screen Off" and "Settings" in the "Tool" category are displayed on the lower right.

The screen 620 to which the third layout has been applied is the screen shown after changing from the user to which the screen 610 with the second layout was shown to another user. On the screen 620 to which the third layout has been applied, the operation icon display region 621 is displayed closer to the driver's seat on the screen and closer to the lower end of the screen. In the operation icon display region 621, "Source," "Music" and "Settings" in the "Audio" category are displayed on the upper left, "Route," "Destination" and "Settings" in the "Navigation" category are displayed on the upper right, "Weather," "News" and "VR" in the "App" category are displayed on the lower left, and "Phone," "Screen Off" and "Settings" in the "Tool" category are displayed on the lower right.

In the example shown in FIG. 9, the icon position changing unit 125 changes the display positions of the operation icons on the screen while avoiding regions in which the operation icons have already been displayed.

Figure 10:
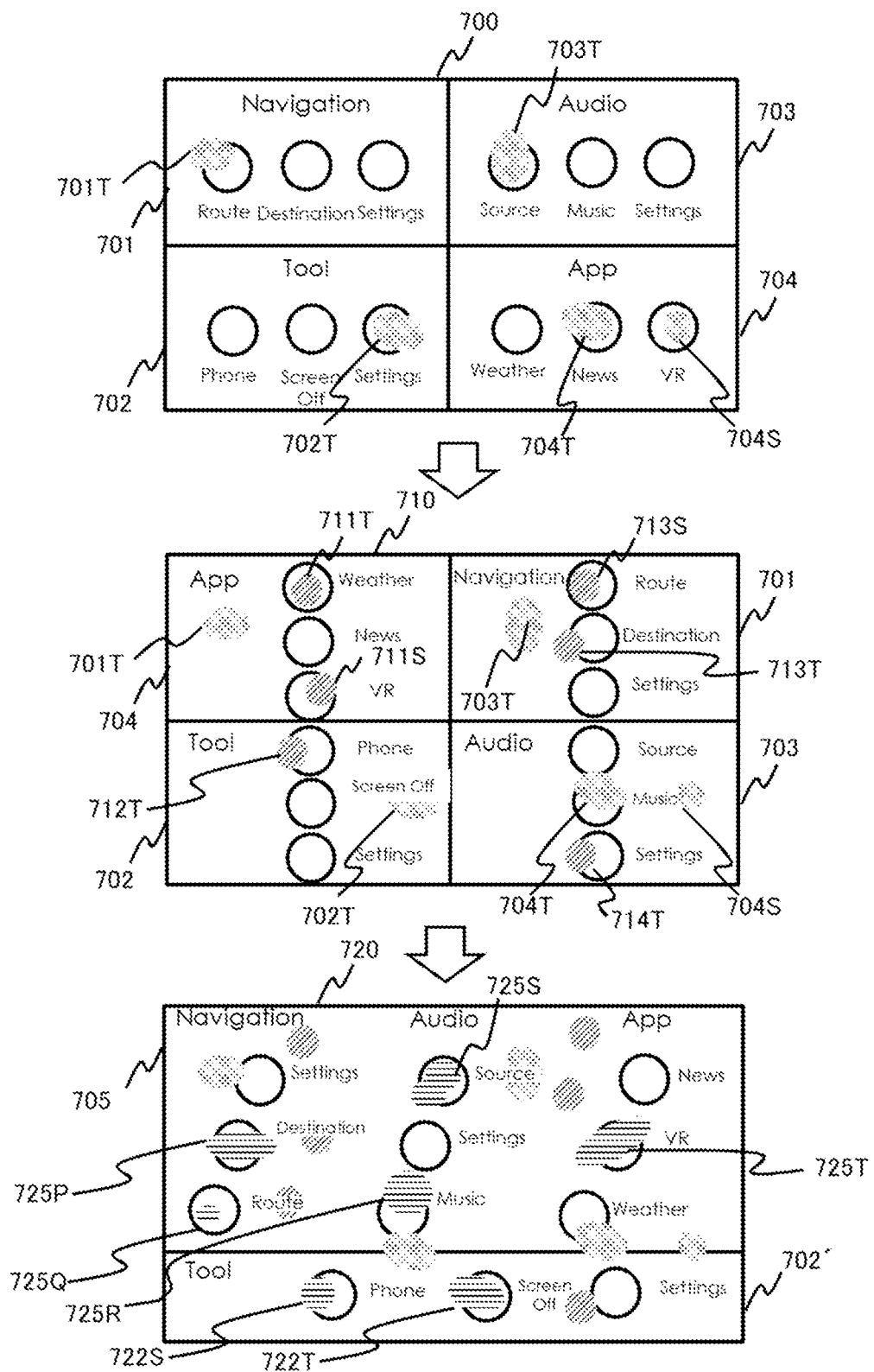
FIG. 10 is a diagram showing another example of changing layout screens.

FIG. 10 is a diagram showing another example of changing layout screens. On the screen 700 to which the fourth layout has been applied, the display region 701 with "Route," "Destination" and "Settings" in the "Navigation" category is displayed in the upper left, the display region 702 with "Phone," "Screen Off" and "Settings" in the "Tool" category is displayed in the lower left, the display region 703 with "Source," "Music" and "Settings" in the "Audio" category is displayed in the upper right, and the display region 704 with "Weather," "News" and "VR" in the "App" category is displayed in the lower right.

On the screen 700 to which the fourth layout has been applied, the user has touched the operation icon for "Route" in display region 701 at touched position 701T. Similarly, the user has touched the operation icon for "Setting" in display region 702 at touched position 702T, the user has touched the operation icon for "Source" in display region 703 at touched position 703T, and the user has touched the operation icons for "VR" and "News" in display region 704 at touched positions 704S and 704T, respectively.

The screen 710 to which the fifth layout has been applied is the screen shown after changing from the user to which the screen 700 with the fourth layout was shown to another user. On the screen 710 to which the fifth layout has been applied, the display region 704 with "Weather," "News" and "VR" in the "App" category is displayed in the upper left, the display region 702 with "Phone," "Screen Off" and "Settings" in the "Tool" category is displayed in the lower left, the display region 701 with "Route," "Destination" and "Settings" in the "Navigation" category is displayed in the upper right, and the display region 703 with "Source," "Music" and "Settings" in the "Audio" category is displayed in the lower right.

On the screen 710 to which the fifth layout has been applied, the user has touched the operation icons for "VR" and "Weather" in display region 704 at touched positions 711S and 711T, respectively. Similarly, the user has touched the operation icon for "Phone" in display region 702 at touched position 712T, the user has touched the operation icons for "Route" and "Destination" in display region 701 at touched positions 713S and 713T, respectively, and the user has touched the operation icon for "Setting" in display region 703 at touched position 714T.

Here, none of the touched positions touched on the screen 710 with the fifth layout in which the positions of the icons have been changed overlap with positions touched by the user of the screen 700 with the fourth layout in which the positions of the icons have been changed.

The screen 720 to which the sixth layout has been applied is the screen shown after changing from the user to which the screen 710 with the fifth layout was shown to another user. On the screen 720 to which the sixth layout has been applied in which the positions of the icons have been changed, the operation icons for "Settings," "Destination" and "Route" in the "Navigation" category are displayed in this order on the left and successively moving further to the left, the operation icons for "Source," "Settings" and "Music" in the "Audio" category are displayed in this order in the center and successively moving further to the left, and the operation icons for "News," "VR" and "Weather" in the "App" category are displayed in the lower right are displayed in this order on the right and successively moving further to the left in Display region 705. Display region 702' with "Phone," "Screen Off" and "Settings" in the "Tool" category is displayed at the bottom of the screen.

On the screen 720 to which the sixth layout has been applied in which the positions of the icons have been changed, the user has touched the operation icons for "Destination," "Route," "Music," "Source" and "VR" in display region 705 at touched positions 725P, 725Q, 725R, 725S and 725T, respectively. Similarly, the user has touched the operation icons for "Phone" and "Screen Off" at touched positions 722S and 722T, respectively.

Here, none of the touched positions touched on the screen 720 with the sixth layout in which the positions of the icons have been changed overlap with positions touched by the previous two users of the screen 700 with the fourth layout in which the positions of the icons have been changed or the user of the screen 710 with the fifth layout in which the positions of the icons have been changed.

Thus, in FIG. 10, indirect contact between users can be avoided by switching the layout for each user in this order.

Figure 11:
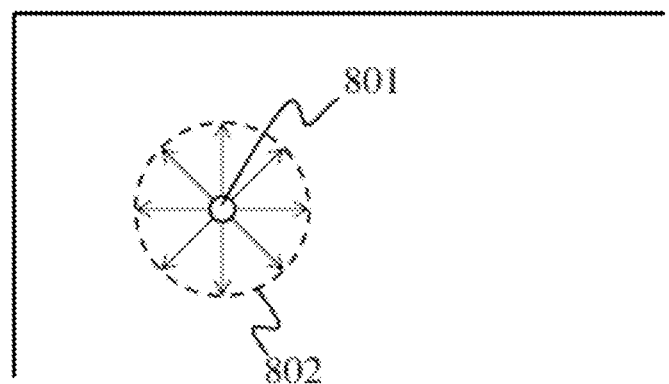
FIG. 11 is a diagram showing an example of a change in the position of an operation icon.
Figure 11:
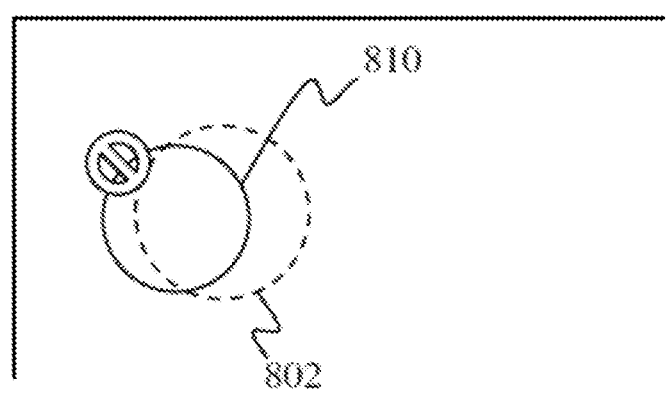
Figure 11:
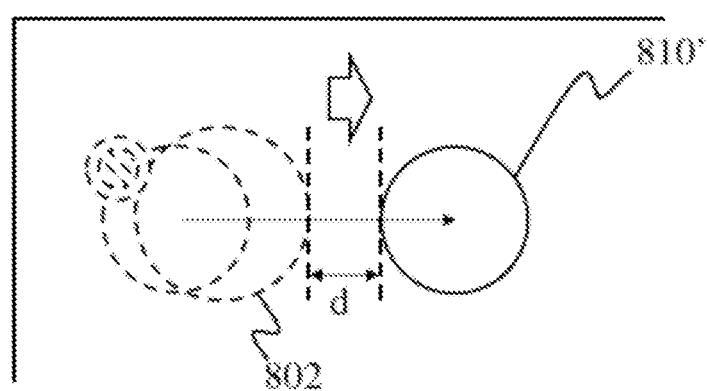

FIG. 11 is a diagram showing an example of a change in the position of an operation icon. When the positions of the operation icons are changed after a change in users, the onscreen position of the operation icon is changed based on the touched position history. In STEP 1, the icon position changing unit 125 sets an avoidance area 802 with a predetermined radius (for example, a radius of about 1 cm) centered on the position 801 touched by a previous user within a predetermined period of time.

In STEP 2, the icon position changing unit 125 detects whether interference has occurred when the operation icon 810 is set at a position within a range overlapping with the avoidance area 802.

In STEP 3, the icon position changing unit 125 avoids the avoidance area 802 and moves the display position of the operation icon 810 to moved position 810' closer to the driver's seat at a predetermined distance d (for example, 1 cm) from the end of the avoidance area 802.

This ends the change in the position of the operation icon. In this example of changing the position of an operation icon, the display position of an operation icon can be changed so as to avoid the history of touched positions. In this way, safety can be improved in terms of hygiene while minimizing any reduction in icon operating convenience.

An information processing device in an embodiment of the present invention was described above. The information processing device 100 in this embodiment can improve safety in terms of hygiene while minimizing any reduction in icon operating convenience.

However, the present invention is not limited to the embodiment described above. Modifications to the embodiment described above are possible without departing from the scope and spirit of the present invention. For example, in the embodiment described above, the positions of operation icons can be changed. However, in step S008 performed to display a screen in which an operation icon has been changed, the screen generating unit 124 can display a generated screen with a message recommending operation by voice input or an audio message making the same recommendation. Specifically, audio guidance may be provided using a message that states the following: "In order to reduce contact with the screen, use of audio input is recommended."

Also, in the embodiment described above, no distinction was made between the driver's seat and the passenger's seat when operating the device. However, the safety of the passenger in the passenger's seat may also be taken into consideration in terms of hygiene. In the example of a screen layout change in FIG. 9, the display region for operation icons is moved closer to the driver's seat side (right side) of the screen. However, the display region for operation icons can be moved closer to the passenger's seat side (left side) of the screen when this is detected based on a gesture performed by the passenger in the passenger's seat or the approach of a hand from the direction of the passenger's seat. This makes it possible to avoid an overlapping contact area with the contact area for the driver's seat, and improve the safety of the passenger in the passenger's seat in terms of hygiene.

Also, in the embodiment described above, the information processing device 100 is connected to the authentication device 500. However, the present invention is not limited to this embodiment. The authentication device 500 may be integrated with the information processing device 100, or the authentication device 500 may be provided as a service via the Internet (for example, via a cloud service) for the information processing device 100 to use. Even more simply, an imaging device may be provided in the information processing device 100 to authenticate the face of a passenger and detect a change in users.

Some or all of the configurations, functions, processing units, and processing means described above may be realized in the form of hardware such as integrated circuits. Information such as programs, tables, and files used to realize each function can be stored in memory, a storage device such as a hard disk or SSD, or a recording medium such as an IC card, SD card, or DVD.

Control lines and information lines were indicated where considered necessary for explanatory purposes, and not all control lines and information lines in the products are shown. In practice, nearly all configurations are interconnected.

| | Key to the Drawings |
|---|---|
| 80: | Communication route |
| 100: | Information processing device |
| 110: | Memory unit |
| 111: | User history information |
| 112: | Touched position history information |
| 113: | Layout information |
| 120: | Processing unit |
| 121: | Authentication result acquiring unit |
| 122: | Touch input detecting unit |
| 123: | Touch position history recording unit |
| 124: | Screen generating unit |
| 125: | Icon position changing unit |
| 130: | Input unit |
| 140: | Display unit |
| 150: | Communication unit |
| 500: | Authentication device |
| 510: | Memory unit |
| 511: | User registration information |
| 520: | Processing unit |
| 521: | Authentication receiving unit |
| 522: | Authentication processing unit |
| 523: | Result transmitting unit |
| 540: | User information detecting unit |
| 550: | Communication unit |

The invention claimed is:

1. An information processing device comprising:
   an authentication result acquiring unit that acquires authentication results of a user who operates the information processing device;
   a display unit that displays one or more operation icons operated by the user;
   a touch input detecting unit that detects a touch operation on an operation icon from among the one or more operation icons displayed on the display unit;
   a touch position history recording unit that detects a touched position in the touch operation along with a time of the touch operation and records the touched position and the time of the touch operation as a historical record in a predetermined storage unit;
   a screen generating unit that generates a screen to be displayed on the display unit; and
   an icon position changing unit that changes a position of the operation icon on the screen based on the historical record of the touched position when there is a change in the user identified in the authentication results obtained by the authentication result acquiring unit, wherein the icon position changing unit excludes the touch operations whose time is not included in a predetermined period from the historical record and changes the position of the operation icon on the screen.

2. The information processing device according to claim 1, wherein the icon position changing unit changes the position of the operation icon to a position away from the touched position included in the historical record of touched positions by a predetermined distance.

3. The information processing device according to claim 1, wherein the icon position change unit further displays a predetermined message and does not change the position of the operation icon on the screen when the position of the operation icon on the screen cannot be changed.

4. The information processing device according to claim 1, wherein the icon position changing unit changes the position of the operation icon on the screen to a position closer to a driver's seat.

5. The information processing device according to claim 1, wherein the screen generating unit displays the screen in any limited region on the display unit, and the icon position changing unit changes the position on the screen while avoiding regions in which the operation icon has already been displayed.

6. The information processing device according to claim 1, wherein the icon position changing unit changes the position of the operation icon on the screen based on the historical record of touched positions even on the screen displayed during a screen transition.

7. The information processing device according to claim 1, wherein the icon position changing unit changes the position of the operation icon on the screen that is frequently touched by the user to a region for touch positions that has not been touched in the historical record.

8. The information processing device according to claim 1, wherein the icon position changing unit changes the position of the operation icon on the screen that is frequently touched by the user to a region for touch positions that has not been touched in the historical record.

9. A method of processing information comprising:
   acquiring an authentication result of a user who operates the information processing device;
   displaying one or more operation icons operated by the user;
   detecting a touch operation on an operation icon from among the one or more operation icons displayed on the display unit;
   detecting a touched position in the touch operation along with a time of the touch operation;
   recording the touched position and the time of the touch operation as a historical record in a predetermined storage unit;
   generating a screen to be displayed on the display unit; and
   changing a position of the operation icon on the screen based on the historical record of the touched position when there is a change in the user identified in the authentication results obtained by the authentication result acquiring unit, wherein the icon position changing unit excludes the touch operations whose time is not included in a predetermined period from the historical record and changes the position of the operation icon on the screen.

10. The method of processing information according to claim 9, wherein the changing of the position of the operation icon changes the position of the operation icon to a position away from the touched position included in the historical record of touched positions by a predetermined distance.

11. The method of processing information according to claim 9, wherein the changing of the position of the operation icon further displays a predetermined message and does not change the position of the operation icon on the screen when the position of the operation icon on the screen cannot be changed.

12. The method of processing information according to claim 9, wherein the changing of the position of the operation icon changes the position of the operation icon on the screen to a position closer to a driver's seat.

13. The method of processing information according to claim 9, wherein the generating of the screen displays the screen in any limited region on the display unit, and the icon position changing unit changes the position on the screen while avoiding regions in which the operation icon has already been displayed.

* * * * *